United States Patent
Xiong et al.

(10) Patent No.: US 10,875,178 B2
(45) Date of Patent: Dec. 29, 2020

(54) MOTION TARGET DIRECTION ANGLE OBTAINING METHOD, APPARATUS AND ROBOT USING THE SAME

(71) Applicant: UBTECH Robotics Corp, Shenzhen (CN)

(72) Inventors: Youjun Xiong, Shenzhen (CN); Xiangbin Huang, Shenzhen (CN); Peng Nie, Shenzhen (CN); Musen Zhang, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 258 days.

(21) Appl. No.: 16/234,636

(22) Filed: Dec. 28, 2018

(65) Prior Publication Data
US 2019/0375099 A1 Dec. 12, 2019

(30) Foreign Application Priority Data
Jun. 11, 2018 (CN) .......................... 2018 1 0595287

(51) Int. Cl.
B25J 9/16 (2006.01)
(52) U.S. Cl.
CPC .......... B25J 9/1664 (2013.01); B25J 9/1653 (2013.01)
(58) Field of Classification Search
CPC .......... H04N 5/23296; H04N 5/23222; H04N 7/183; H04N 5/23203; H04N 5/23206; H04N 5/247; H04N 5/23218; H04N 5/23299; B25J 9/1692; B25J 13/00; B25J 9/06; B25J 9/106; B25J 9/16; B25J 9/1607; B25J 9/1653; B25J 9/1664; G01S 17/88; G01S 17/46; G01S 13/426; G01S 13/726; G01S 13/878; G01S 5/04; G01S 13/86;
(Continued)

(56) References Cited

U.S. PATENT DOCUMENTS

| | | | | |
|---|---|---|---|---|
| 7,146,242 B2 * | 12/2006 | Weinhofer | ............. | B25J 9/1664 700/189 |
| 8,918,210 B2 * | 12/2014 | Kagawa | ................. | B25J 9/1692 700/254 |
| 9,043,146 B2 * | 5/2015 | Troy | ....................... | G06F 17/16 701/519 |
| 9,197,810 B2 * | 11/2015 | Troy | .................. | H04N 5/23296 |

(Continued)

OTHER PUBLICATIONS

Goel et al., A Motion Correction Technique for Laser Scanning of Moving Objects, 2013, IEEE, p. 225-228 (Year: 2013).*
Tegeopoulou et al., Determination of rigid-body pose from imprecise point position measurements, 2011, IEEE, p. 2922-2927 (Year: 2011).*

(Continued)

*Primary Examiner* — Mcdieunel Marc (57) ABSTRACT

A motion target direction angle obtaining method and a robot using the same. The method includes: creating an absolute coordinate system, and obtaining an absolute position coordinate of at least one point after the first point in the absolute coordinate system; creating a relative coordinate system with the first point as an origin, and obtaining a relative position coordinate corresponding to the at least one point In the relative coordinate system; calculating matrix parameters of a transformation matrix based on the absolute position coordinate of the at least one point and the relative position coordinate corresponding to the at least one point; and determining a direction angle of the motion target at the first point based on the matrix parameters. Combines an absolute portioning method and a relative positioning method to calculate the direction angle.

20 Claims, 7 Drawing Sheets

(58) Field of Classification Search
CPC ........ G06F 17/16; G06F 1/3209; G06F 3/011;
G06F 3/012; G06F 3/013; G06K
2009/3225; G06K 9/3216; G06K 9/3241;
G06K 9/00208; G06K 9/00342; G06K
9/00597; G06K 9/32; G06K 9/6278;
G06T 2207/10016; G06T 2207/10048;
G06T 2207/30241; G06T 2207/30244;
G06T 7/246; G06T 7/73; G06T 7/0042;
G06T 7/2033; Y10S 901/46; G01B 5/008;
G01B 21/042; G05B 2219/40519; G05B
2219/40588; G05B 19/19; G05B 19/41;
G05B 2219/34095; G05B 2219/34131;
G05B 2219/34135; G05B 2219/34145;
G05B 2219/34177; G05B 2219/35585;
G05B 2219/40395; G05B 2219/42176;
G05B 2219/45083; G05B 2219/39079
See application file for complete search history.

(56) References Cited

U.S. PATENT DOCUMENTS

| | | | | |
|---|---|---|---|---|
| 9,742,974 | B2* | 8/2017 | Tang | G06K 9/6278 |
| 2012/0032835 | A1* | 2/2012 | Mazzei | G01S 13/426 |
| | | | | 342/123 |
| 2015/0042812 | A1* | 2/2015 | Tang | G06K 9/00342 |
| | | | | 348/157 |
| 2019/0275673 | A1* | 9/2019 | Kawase | B25J 9/106 |

OTHER PUBLICATIONS

Alkkiomaki et al., Online trajectory following with position based force/vision control, 2009, IEEE, p. 1-6 (Year: 2009).*

Yue et al., A fast target localization method with multi-point observation for a single UAV, 2016, IEEE, p. 5389-5394 (Year: 2016).*

* cited by examiner

MOTION TARGET DIRECTION ANGLE OBTAINING METHOD, APPARATUS AND ROBOT USING THE SAME

CROSS REFERENCE TO RELATED APPLICATIONS

This application claims priority to Chinese Patent Application No. 201810595287.5, filed Jun. 11, 2018, which is hereby incorporated by reference herein as if set forth in its entirety.

BACKGROUND

1. Technical Field

The present disclosure relates to positioning technology, and particularly to a motion target direction angle obtaining method and apparatus as well as a robot using the same.

2. Description of Related Art

A motion target may be a target device having the capability of autonomous motion or moving in response to manipulation instructions, for example, a robot, a smart car, or a smart aircraft, or be other target having the capability of moving and carrying a positioning device, for example, a target person or target object carrying a positioning device.

At present, the positioning of motion targets has become more and more important. Taking robots as an example, navigation is one of the most basic and challenging capabilities of mobile robots, and the accurate positioning for a robot is the basis for ensuring the stable operation of a navigation system. The problems about the positioning of a robot include obtaining the real-time position and direction angle (e.g., yaw angle) of the robot in an environment. The common robot wireless positioning methods include absolute positioning methods such as UWB (ultra wideband) based positioning and GPS (global positioning system) positioning as well as relative positioning methods such as odometer based positioning and IMU (inertial measurement unit) based positioning.

In an absolute positioning method, when a position is demarcated in a map, the positioning is accurate while it will not output the direction angle, and the accurate orientation cannot be realized. When an odometer is used on a robot, the position and the direction angle of the robot are estimated by calculating the accumulative signal number of the encoder and the IMU of the robot. In this case, there has good data precision in a short time while accumulative errors will be generated after a long motion of the robot, which affects the positioning precision.

At present, in order to solve the problem of direction angles, it usually uses a least squares method to calculate a direction angle by: collecting multiple sets of position data of a robot, fitting the data by curve fitting or straight line fitting, and calculating the current direction angle of the robot by calculating the slope of the current fitting points. In which, the two data fitting methods have the following drawbacks:

1. for the straight line fitting, since there are mainly curves in the navigation route of the robot, the precision of the straight line fitting is low in most cases, and the accurate direction angle of the robot cannot be provided in real time.

2. for the curve fitting, the fitting of the long-term motion curve of the robot is generally can not be performed by using the existing curve, while the fitting point of the short-term motion curve of the robot is diverged.

BRIEF DESCRIPTION OF THE DRAWINGS

To describe the technical schemes in this embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 1:
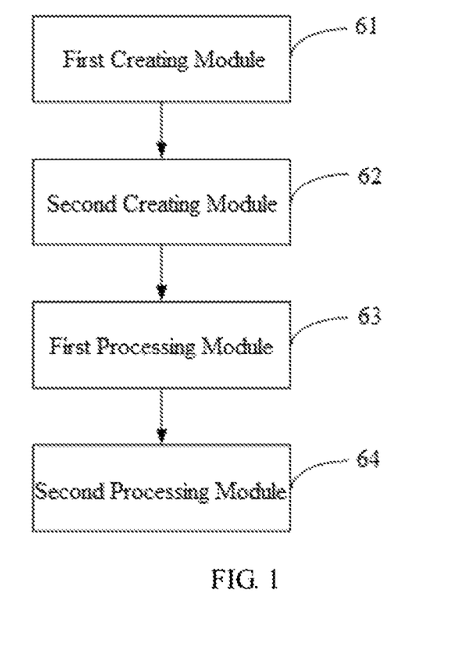
FIG. 1 is a schematic block diagram of a direction angle obtaining apparatus for a motion target according to an embodiment of the present disclosure.
Figure 3:
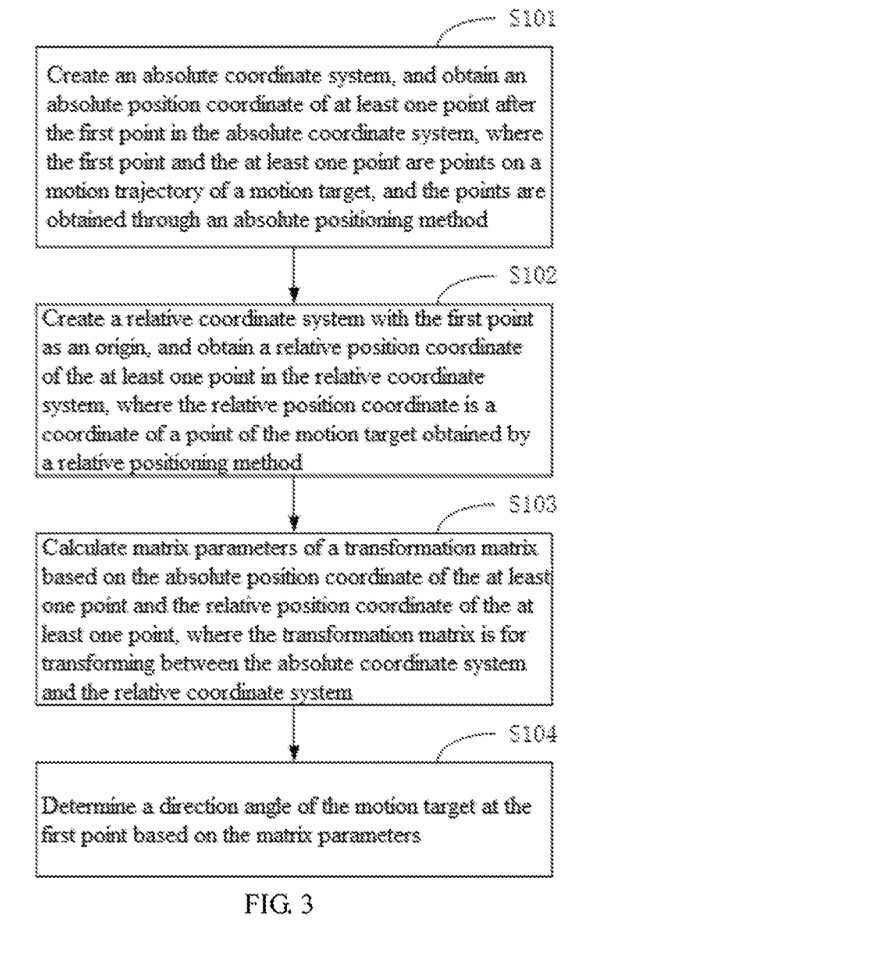
FIG. 3 is a flow chart of a direction angle obtaining method for a motion target according to an embodiment of the present disclosure.

FIG. 1 is a schematic block diagram of a direction angle obtaining apparatus for a motion target according to an embodiment of the present disclosure, which corresponds to a direction angle obtaining method shown in FIG. 3. For the convenience of explanation, only the parts related to this embodiment are shown.

As shown in FIG. 1, a direction angle obtaining apparatus for a motion target includes a first creating module 61, a second creating module 62, a first processing module 63, and a second processing module 64. In this embodiment, the motion target is a robot. In other embodiments, the motion target may be, for example, a smart car, a smart aircraft, or other target device having the capability of moving and carrying a positioning device.

The first creating module 61 is configured to create an absolute coordinate system, and obtain an absolute position coordinate of at least one point after the first point in the absolute coordinate system, where the first point and the at least one point are points on a motion trajectory of a motion target, and the points are obtained through an absolute positioning method.

The second creating module 62 is configured to create a relative coordinate system with the first point as an origin, and obtain a relative position coordinate corresponding to the at least one point in the relative coordinate system, where the relative position coordinate is a coordinate of a point of the motion target obtained by a relative positioning method.

The first processing module 63 is configured to calculate matrix parameters of a transformation matrix based on the absolute position coordinate of the at least one point and the relative position coordinate corresponding to the at least one point, where the transformation matrix is for transforming between the absolute coordinate system and the relative coordinate system.

The second processing module 64 is configured to determine a direction angle of the motion target at the first point based on the matrix parameters.

In one embodiment, the first processing module 63 is configured to:

create a matrix equation corresponding to each point based on the absolute position coordinate of each point, the relative position coordinate of each point, and the transformation matrix;

compose the matrix equation corresponding to each point into overdetermined equations; and solve the overdetermined equations to obtain the matrix parameters of the transformation matrix.

In one embodiment, the first processing module 63 is configured to:

decouple the overdetermined equations; and solve the decoupled overdetermined equations based on a least squares method to obtain the matrix parameters of the transformation matrix.

In one embodiment, the transformation matrix is for transforming the absolute coordinate system to the relative coordinate system, and the equation of the transformation matrix is:

$$\begin{bmatrix} x_{map}^i & y_{map}^i & 1 & 0 \\ y_{map}^i & -x_{map}^i & 0 & 1 \end{bmatrix} \begin{bmatrix} \cos(\theta) \\ \sin(\theta) \\ m \\ n \end{bmatrix} = \begin{bmatrix} x_{odom}^i \\ y_{odom}^i \end{bmatrix}$$

where, $(x_{map}^i, y_{map}^i)$ is the absolute position coordinate of the i-th point; $(x_{odom}^i, y_{odom}^i)$ is the relative position coordinate of the i-th point; and $\theta$, m, and n are the matrix parameters.

In one embodiment, the absolute positioning method includes positioning the motion target through distances between the motion target and a plurality of base stations.

In one embodiment, the relative positioning method includes positioning the motion target through an odometer disposed on the motion target, wherein the relative coordinate system includes an odometer coordinate system of the odometer.

It should be noted that, each of the above-mentioned modules/units may be implemented in the form of hardware (e.g., a circuit), software (e.g., a program), or a combination thereof (e.g., a circuit with a single chip microcomputer).

In this embodiment, the matrix parameters of the transformation matrix of the absolute coordinate system and the relative coordinate system are calculated through the absolute position coordinate and the relative position coordinate of the at least one point, and then the direction angle of the motion target at the first point is determined based on the matrix parameters, which is capable of calculating the direction angle of the motion target accurately. The present disclosure combines the absolute positioning method and the relative positioning method, and uses two types of position coordinates of multiple positions and the transformation matrix between two coordinate systems to calculate the direction angle, which is capable of realizing the high-precision calculation of the direction angle.

Figure 2:
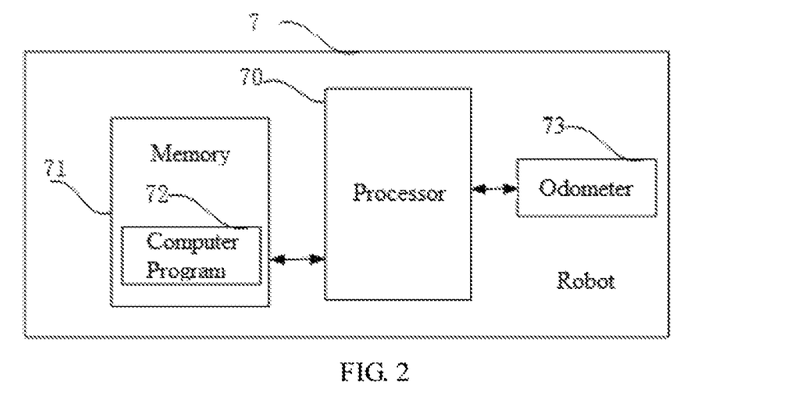
FIG. 2 is a schematic block diagram of a robot according to an embodiment of the present disclosure.

FIG. 2 is a schematic block diagram of a robot according to an embodiment of the present disclosure. As shown in FIG. 2, the robot 7 of this embodiment includes a processor 70, a memory 71, and a computer program 72 stored in the memory 71 and executable on the processor 70, and an odometer 73. When executing (instructions in) the computer program 72, the processor 70 implements the steps in the embodiments of the methods, for example, steps S101-S104 shown in FIG. 3. Alternatively, when the processor 70 executes the (instructions in) computer program 72, the functions of each module/unit in the device embodiments, for example, the functions of the modules 61-64 shown in FIG. 1 are implemented.

Exemplarily, the computer program 72 may be divided into one or more modules/units, and the one or more modules/units are stored in the storage 71 and executed by the processor 70 to realize the present disclosure. The one or more modules/units may be a series of computer program instruction sections capable of performing a specific function, and the instruction sections are for describing the execution process of the computer program 72 in the robot 7. For example, computer program 72 can be divided into a first creating module, a second creating module, a first processing module, and a second processing module. The specific function of each module is as follows.

The first creating module is configured to create an absolute coordinate system, and obtain an absolute position coordinate of at least one point after the first point in the absolute coordinate system, where the first point and the at least one point are points on a motion trajectory of a motion target, and the points are obtained through an absolute positioning method.

The second creating module is configured to create a relative coordinate system with the first point as an origin, and obtain a relative position coordinate corresponding to the at least one point in the relative coordinate system, where the relative position coordinate is a coordinate of a point of the motion target obtained by a relative positioning method.

The first processing module is configured to calculate matrix parameters of a transformation matrix based on the absolute position coordinate of the at least one point and the relative position coordinate corresponding to the at least one point, where the transformation matrix is for transforming between the absolute coordinate system and the relative coordinate system.

The second processing module is configured to determine a direction angle of the motion target at the first point based on the matrix parameters.

In one embodiment, the relative positioning method includes positioning the robot through the odometer, where the relative coordinate system includes an odometer coordinate system of the odometer.

It can be understood by those skilled in the art that FIG. 2 is merely an example of the robot 7 and does not constitute a limitation on the robot 7, and may include more or fewer components than those shown in the figure, or a combination of some components or different components. For example, the robot 7 may further include an input/output device, a network access device, a bus, a display, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 71 may be an internal storage unit of the robot 7, for example, a hard disk or a memory of the robot 7. The storage 71 may also be an external storage device of the robot 7, for example, a plug-in hard disk, a smart media card (SMC), a secure digital (SD) card, flash card, and the like, which is equipped on the robot 7. Furthermore, the storage 71 may further include both an internal storage unit and an external storage device, of the robot 7. The storage 71 is configured to store the computer program 72 and other programs and data required by the robot 7. The storage 71 may also be used to temporarily store data that has been or will be output.

FIG. 3 is a flow chart of a direction angle obtaining method for a motion target according to an embodiment of the present disclosure. In this embodiment, the method is a computer-implemented method executable for a processor, which may be implemented through a direction angle obtaining apparatus for a motion target as shown in FIG. 1. The motion target is a robot. In other embodiments, the motion target may be, for example, a smart car, a smart aircraft, or other target device having the capability of moving and carrying a positioning device. As shown in FIG. 3, the method includes the following steps.

S101: creating an absolute coordinate system, and obtaining an absolute position coordinate of at least one point after the first point in the absolute coordinate system, where the first point and the at least one point are points on a motion trajectory of a motion target, and the points are obtained through an absolute positioning method.

The absolute positioning method may include UWB (ultra wideband) based positioning, GPS (Global Positioning System) positioning, or positioning a motion target through distances between the motion target and a plurality of base stations. In this embodiment, the method of positioning the motion target through distances between the motion target and a plurality of base stations for example, an UWB based positioning, is used, which can accurately position a motion track of the motion target in the absolute coordinate system. It should be noted that other absolute positioning methods can also be adopted, which is not limited herein.

The first point is a point at which a direction angle calculation is required. It can select at least one point on the motion trajectory of the motion target which is located after the first point, and obtain the absolute position coordinate of the at least one point. The absolute position coordinate is a coordinate in the absolute coordinate system which is positioned through the absolute positioning method. The time corresponding to any of the at least one point is after the time corresponding to the first point, that is, the motion target is moved to the first point first, and then moved to the at least one point.

The at least one point which is close to the first point can be obtained according to the first point, so that the direction angle (e.g., a yaw angle) can be calculated in a shorter time after the motion target is moved to the first point, thereby ensuring the timeliness of the calculation of the direction angle of the first position, so as to navigate or adjust the motion posture of the motion target in time based on the direction angle of the first point. For example, the distance between the first point and any two adjacent points in the at least one point is less than a preset distance threshold, or the time of the motion target to move between any two adjacent points is less than a preset time threshold, so that the timeliness of the calculation of the direction angle of the first position can be ensured.

S102: creating a relative coordinate system with the first point as an origin, and obtaining a relative position coordinate of the at least one point in the relative coordinate system, where the relative position coordinate is a coordinate of a point of the motion target obtained by a relative positioning method.

In this embodiment, the relative positioning method may include odometer based positioning or IMU based positioning, and the coordinate of the current position of the motion target with respect to a starting position can be positioned through the relative positioning method, so as to create the relative coordinate system with the starting position as the origin. In this embodiment, when the direction angle of the first point is calculated, the first point is used as the starting position, and the relative coordinate system with the first position point as the origin is created.

In this embodiment, the positioning method of positioning the motion target through an odometer is used, which can position the coordinate of the point of the motion target in the relative coordinate system in an accurate manner. The relative coordinate system may include an odometer coordinate system. In which, the odometer coordinate system may take the first point as the origin, and the right front of the motion target at the first point is defined as the X axis of the odometer coordinate system, and the left of the motion target is defined as the Y axis of the odometer coordinate system. The odometer can calculate the current pose of the motion target by performing integration calculation through a motor encoder, where the pose includes the coordinate and the direction angle (for example, a yaw angle, a roll angle, and/or a pitch angle). It should be noted that other relative positioning methods can also be adopted, which is not limited herein.

Figure 4:
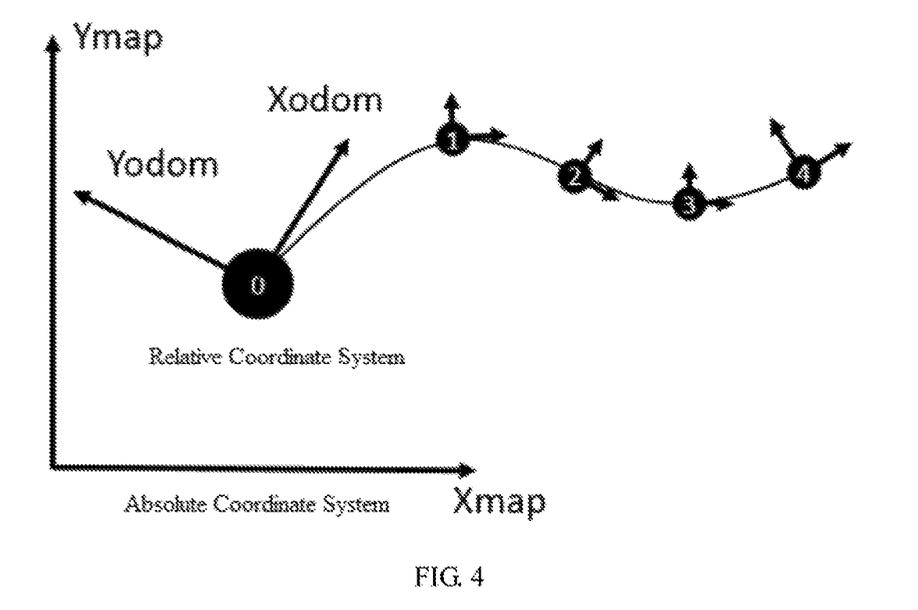
FIG. 4 is a schematic diagram of an absolute coordinate system and a relative coordinate system in the method of the embodiment of FIG. 3.

FIG. 4 is a schematic diagram of an absolute coordinate system and a relative coordinate system in the method of the embodiment of FIG. 3. As shown in FIG. 4, Xmap is the horizontal axis (i.e., X axis) of the absolute coordinate system, Ymap is the vertical axis (i.e., Y axis) of the absolute coordinate system, Xodom is the horizontal axis (i.e., X axis) of the relative coordinate system, and Yodom is the vertical axis (i.e., Y axis) of the relative coordinate system. The curves in the figure are the motion trajectories of the motion target, and the motion target is sequentially moved to pass through position 0, position 1, position 2, position 3, and position 4. Position 0 is the first point. In this embodiment, the coordinates of the four points are obtained to calculate the direction angle of the motion target at the first point, that is, the direction angle of the motion target at position 0 is calculated through the coordinate of position 1, position 2, position 3, and position 4. The direction angle of the motion target at position 0 can be calculated by obtaining more or less points, which is not limited herein.

S103: calculating matrix parameters of a transformation matrix based on the absolute position coordinate of the at least one point and the relative position coordinate of the at least one point, where the transformation matrix is for transforming between the absolute coordinate system and the relative coordinate system.

In this embodiment, the transformation matrix may be a matrix for transforming from the absolute coordinate system to the relative coordinate system, or may be a matrix for transforming from the relative coordinate system to the absolute coordinate system, which is not limited herein. One point corresponds to one absolute position coordinate and one relative position coordinate. The matrix parameters of the transformation matrix can be calculated based on the absolute position coordinate of the at least one point and the relative position coordinate of the at least one point.

Figure 5:
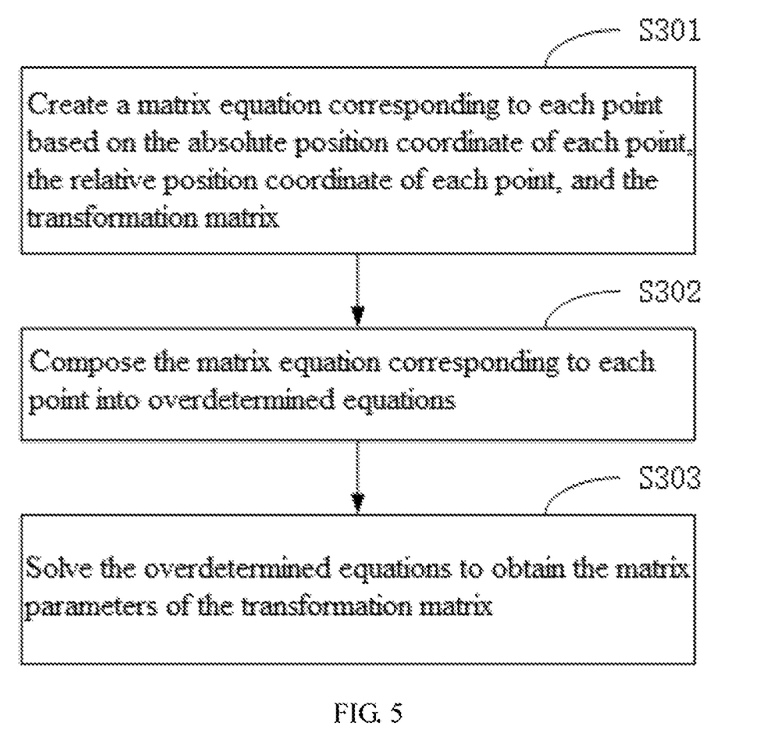
FIG. 5 is a flow chart of creating overdetermined equations in the method of the embodiment of FIG. 3.

FIG. 5 is a flow chart of creating overdetermined equations in the method of the embodiment of FIG. 3. As shown in FIG. 5, in one embodiment, step S103 of the method of the embodiment of FIG. 3 may include the following steps.

S301: creating a matrix equation corresponding to each point based on the absolute position coordinate of each point, the relative position coordinate of each point, and the transformation matrix.

In this embodiment, the matrix equation corresponding to one point can be created based on the absolute position coordinate, the relative position coordinate, and the transformation matrix of the point. The matrix equation corresponding to each point is respectively created. In which, the matrix parameters are used as the unknown variable of the matrix equation.

The description is made by an example as follows. The transformation matrix is a matrix for transforming from the absolute coordinate system to the relative coordinate system, and a formula for transforming coordinate system based on the transformation matrix is as follows:

$$\begin{bmatrix} x_{odom} \\ y_{odom} \\ 1 \end{bmatrix} = \begin{bmatrix} \cos(\theta) & \sin(\theta) & m \\ -\sin(\theta) & \cos(\theta) & n \\ 0 & 0 & 1 \end{bmatrix} \begin{bmatrix} x_{map} \\ y_{map} \\ 1 \end{bmatrix} \quad (1)$$

the matrix parameters are used as the unknown variable to convert the formula (1) into the matrix equation, and the obtained matrix equation is as follows:

$$\begin{bmatrix} x^i_{map} & y^i_{map} & 1 & 0 \\ y^i_{map} & -x^i_{map} & 0 & 1 \end{bmatrix} \begin{bmatrix} \cos(\theta) \\ \sin(\theta) \\ m \\ n \end{bmatrix} = \begin{bmatrix} x^i_{odom} \\ y^i_{odom} \end{bmatrix} \quad (2)$$

where $(x^i_{map}, y^i_{map})$ is the absolute position coordinate of the i-th point; $(x^i_{odom}, y^i_{odom})$ is the relative position coordinate of the i-th point; and $\theta$, m, and n are matrix parameters.

It should be noted that the transformation matrix may also be a matrix for transforming from the relative coordinate system to the absolute coordinate system, and the corresponding transformation matrix and the matrix equation will change. Therefore, the transformation matrix and the matrix equation are not limited herein, which are only used as examples.

S302: composing the matrix equation corresponding to each point into overdetermined equations.

S303: solving the overdetermined equations to obtain the matrix parameters of the transformation matrix.

If the absolute positioning method and the relative positioning method do not have positioning errors, there is only one unique solution for the transformation matrix of transforming from the absolute coordinate system to the relative coordinate system. However, in the actual positioning, there are positioning errors in the absolute positioning method and the relative positioning method, which results in that the solution for the transformation matrix is not unique. If the transformation matrix is calculated only by the absolute position coordinate and relative position coordinate of one point, there will be a large error in the transformation matrix. In this embodiment, the matrix equations corresponding to multiple points are composed into the overdetermined equations, and then the overdetermined equations are solved, which is capable of calculating the transformation matrix by integrating the coordinates of the multiple points, thereby reducing the error of the transformation matrix and improving the precision of the calculation of the direction angle.

Figure 6:
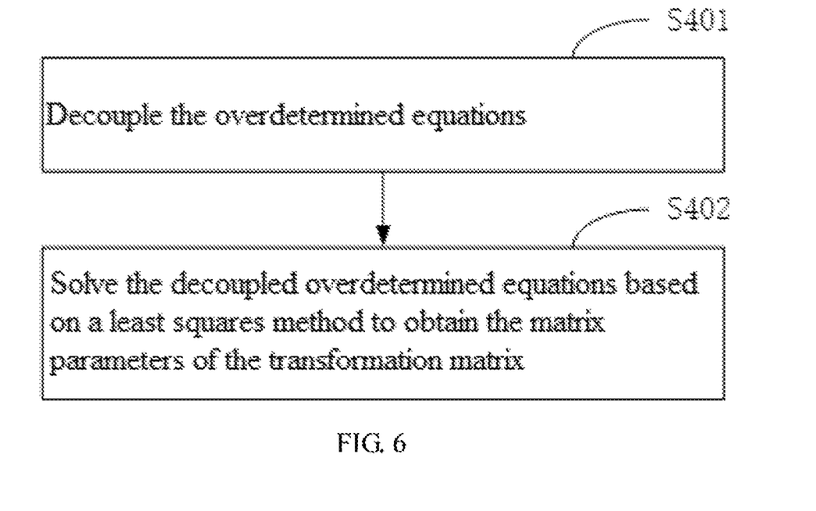
FIG. 6 is a flow chart of solving overdetermined equations in the method of the embodiment of FIG. 3.

FIG. 6 is a flow chart of solving overdetermined equations in the method of the embodiment of FIG. 3. In one embodiment, as shown in FIG. 6, step S303 of the method of the embodiment of FIG. 3 may include the following steps.

S401: decoupling the overdetermined equations.

S402: solving the decoupled overdetermined equations based on a least squares method to obtain the matrix parameters of the transformation matrix.

In this embodiment, the overdetermined equations can be decoupled to linearize the equations, and the overdetermined equations are solved through the least squares method so as to obtain the accurate matrix parameters.

For example, assuming that $s=\sin(\theta)$ and $c=\cos(\theta)$, after $\sin(\theta)$ and $\cos(\theta)$ of the overdetermined equations are decoupled, the decoupled overdetermined equations will become to:

$$\begin{bmatrix} x^i_{map} & y^i_{map} & 1 & 0 \\ y^i_{map} & -x^i_{map} & 0 & 1 \end{bmatrix}_{i=1,2,3,4} \begin{bmatrix} c \\ s \\ m \\ n \end{bmatrix} = \begin{bmatrix} x^i_{odom} \\ y^i_{odom} \end{bmatrix}_{i=1,2,3,4} \quad (3)$$

the least squares method is used to solve c and s in the overdetermined equations, so as to determine the matrix parameters of the transformation matrix.

In this embodiment, the solution of the overdetermined equations can be accurately solved through the decoupling process and the least squares method, thereby ensuring the precision of the matrix parameters.

S104: determining a direction angle of the motion target at the first point based on the matrix parameters.

In this embodiment, since the relative coordinate system is created with the first point as the origin, the transformation matrix of the absolute coordinate system and the relative coordinate system is related to the direction angle of the motion target at the first point, and the direction angle of the motion target at the first point can be determined based on the matrix parameters.

In this embodiment, the matrix parameters of the transformation matrix of the absolute coordinate system and the relative coordinate system are calculated through the absolute position coordinate and the relative position coordinate of the at least one point, and then the direction angle of the motion target at the first point is determined based on the matrix parameters, which is capable of calculating the direction angle of the motion target accurately. The present disclosure combines the absolute positioning method and the relative positioning method, and uses two types of position coordinates of multiple positions and the transformation matrix between two coordinate systems to calculate the direction angle, which is capable of realizing the high-precision calculation of the direction angle.

Figure 7:
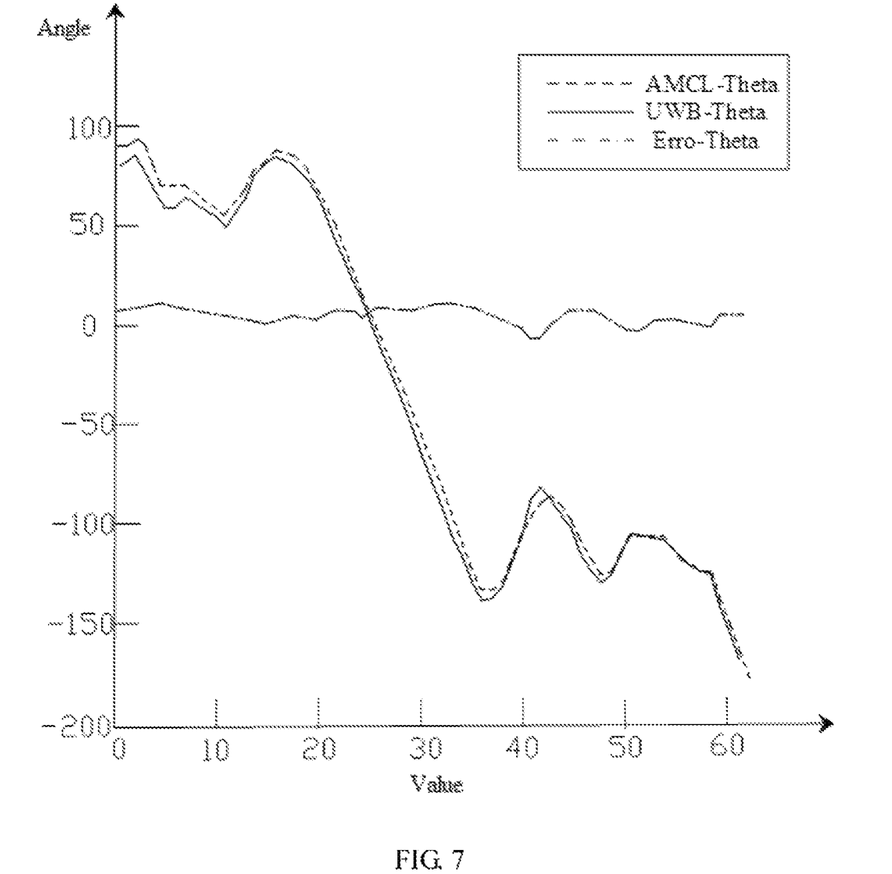
FIG. 7 is a schematic diagram of verifying an effect of the method of the embodiment of FIG. 3.

In order to verify the feasibility of this embodiment, the direction angle calculated using AMCL (adaptive Monte Carlo localization) is adopted to compare with the direction angle calculated using the method provided by this embodiment. FIG. 7 is a schematic diagram of verifying an effect of the method of the embodiment of FIG. 3. As shown in FIG. 7, the horizontal axis (i.e., X axis) represents different points, and the vertical axis (i.e., Y axis) represents the degrees of the direction angles at different points. In the figure, curve AMCL-Theta is a curve formed by using AMCL to calculate the direction angles of different points, curve UWB-Theta is a curve formed by using the method of this embodiment to calculate the direction angle of different points, and curve Erro-Theta is a difference curve between the two. By calculating the deviation between the two, the maximum error angle of 13.5435 degrees and the average error angle of 3.7357 degrees are obtained, which proves the effectiveness of the method of this embodiment. It can also be seen from FIG. 7 that the floating angle of curve Erro-Theta curve is close to zero, that is, this embodiment realizes the high-precision calculation of the direction angle.

It should be understood that, the sequence of the serial number of the steps in the above-mentioned embodiments does not mean the execution order while the execution order of each process should be determined by its function and internal logic, which should not be taken as any limitation to the implementation process of the embodiments.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in this embodiment may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in this embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In this embodiments provided by the present disclosure, it should be understood that the disclosed apparatus/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented direction angle obtaining method for a motion object, comprising executing on a processor the steps of:
creating an absolute coordinate system, and obtaining an absolute position coordinate of at least one point after the first point in the absolute coordinate system, wherein the first point and the at least one point are points on a motion trajectory of the motion target, and the points are obtained through an absolute positioning method;
creating a relative coordinate system with the first point as an origin, and obtaining a relative position coordinate corresponding to the at least one point in the relative coordinate system, wherein the relative position coordinate is a coordinate of a point of the motion target obtained by a relative positioning method;
calculating matrix parameters of a transformation matrix based on the absolute position coordinate of the at least one point and the relative position coordinate corresponding to the at least one point, wherein the transformation matrix is for transforming between the absolute coordinate system and the relative coordinate system; and
determining a direction angle of the motion target at the first point based on the matrix parameters.

2. The method of claim 1, wherein the step of calculating the matrix parameters of the transformation matrix based on the absolute position coordinate of the at least one point and the relative position coordinate corresponding to the at least one point comprises:
creating a matrix equation corresponding to each point based on the absolute position coordinate of each point, the relative position coordinate of each point, and the transformation matrix;
composing the matrix equation corresponding to each point into overdetermined equations; and
solving the overdetermined equations to obtain the matrix parameters of the transformation matrix.

3. The method of claim 2, wherein the step of solving the overdetermined equations to obtain the matrix parameters of the transformation matrix comprises:
decoupling the overdetermined equations; and
solving the decoupled overdetermined equations based on a least squares method to obtain the matrix parameters of the transformation matrix.

4. The method of claim 2, wherein the transformation matrix is for transforming the absolute coordinate system to the relative coordinate system, and the equation of the transformation matrix is:

$$\begin{bmatrix} x^i_{map} & y^i_{map} & 1 & 0 \\ y^i_{map} & -x^i_{map} & 0 & 1 \end{bmatrix} \begin{bmatrix} \cos(\theta) \\ \sin(\theta) \\ m \\ n \end{bmatrix} = \begin{bmatrix} x^i_{odom} \\ y^i_{odom} \end{bmatrix}$$

where, $(x^i_{map}, y^i_{map})$ is the absolute position coordinate of the i-th point; $(x^i_{odom}, y^i_{odom})$ is the relative position coordinate of the i-th point; and $\theta$, $m$, and $n$ are the matrix parameters.

5. The method of claim 1, wherein the absolute positioning method comprises positioning the motion target through distances between the motion target and a plurality of base stations.

6. The method of claim 1, wherein the relative positioning method comprises positioning the motion target through an odometer disposed on the motion target, wherein the relative coordinate system comprises an odometer coordinate system of the odometer.

7. The method of claim 1, wherein the motion target is a robot.

8. A direction angle obtaining apparatus for a motion target, comprising:
a first creating module configured to create an absolute coordinate system, and obtain an absolute position coordinate of at least one point after the first point in the absolute coordinate system, wherein the first point and the at least one point are points on a motion trajectory of the motion target, and the points are obtained through an absolute positioning method;
a second creating module configured to create a relative coordinate system with the first point as an origin, and obtain a relative position coordinate corresponding to the at least one point in the relative coordinate system, wherein the relative position coordinate is a coordinate of a point of the motion target obtained by a relative positioning method;
a first processing module configured to calculate matrix parameters of a transformation matrix based on the absolute position coordinate of the at least one point and the relative position coordinate corresponding to the at least one point, wherein the transformation matrix is for transforming between the absolute coordinate system and the relative coordinate system; and
a second processing module configured to determine a direction angle of the motion target at the first point based on the matrix parameters.

9. The apparatus of claim 8, wherein the first processing module is configured to calculate the matrix parameters of the transformation matrix by:
creating a matrix equation corresponding to each point based on the absolute position coordinate of each point, the relative position coordinate of each point, and the transformation matrix;
composing the matrix equation corresponding to each point into overdetermined equations; and
solving the overdetermined equations to obtain the matrix parameters of the transformation matrix.

10. The apparatus of claim 9, wherein the first processing module is configured to solve the overdetermined equations to obtain the matrix parameters of the transformation matrix by:
decoupling the overdetermined equations; and
solving the decoupled overdetermined equations based on a least squares method to obtain the matrix parameters of the transformation matrix.

11. The apparatus of claim 9, wherein the transformation matrix is for transforming the absolute coordinate system to the relative coordinate system, and the equation of the transformation matrix is:

$$\begin{bmatrix} x^i_{map} & y^i_{map} & 1 & 0 \\ y^i_{map} & -x^i_{map} & 0 & 1 \end{bmatrix} \begin{bmatrix} \cos(\theta) \\ \sin(\theta) \\ m \\ n \end{bmatrix} = \begin{bmatrix} x^i_{odom} \\ y^i_{odom} \end{bmatrix}$$

where, $(x_{map}^i, y_{map}^i)$ is the absolute position coordinate of the i-th point; $(x_{odom}^i, y_{odom}^i)$ is the relative position coordinate of the i-th point; and θ, m, and n are the matrix parameters.

12. The apparatus of claim 8, wherein the absolute positioning method comprises positioning the motion target through distances between the motion target and a plurality of base stations.

13. The apparatus of claim 8, wherein the relative positioning method comprises positioning the motion target through an odometer disposed on the motion target, wherein the relative coordinate system comprises an odometer coordinate system of the odometer.

14. The apparatus of claim 8, wherein the motion target is a robot.

15. A robot comprising:
a memory;
a processor, and
one or more computer programs stored in the memory and executable on the processor, wherein the one or more computer programs comprise:
instructions for creating an absolute coordinate system, and obtaining an absolute position coordinate of at least one point after the first point in the absolute coordinate system, wherein the first point and the at least one point are points on a motion trajectory of the robot, and the points are obtained through an absolute positioning method;
instructions for creating a relative coordinate system with the first point as an origin, and obtaining a relative position coordinate corresponding to the at least one point in the relative coordinate system, wherein the relative position coordinate is a coordinate of a point of the robot obtained by a relative positioning method;
instructions for calculating matrix parameters of a transformation matrix based on the absolute position coordinate of the at least one point and the relative position coordinate corresponding to the at least one point, wherein the transformation matrix is for transforming between the absolute coordinate system and the relative coordinate system; and
instructions for determining a direction angle of the robot at the first point based on the matrix parameters.

16. The robot of claim 15, wherein the instructions for calculating the matrix parameters of the transformation matrix based on the absolute position coordinate of the at least one point and the relative position coordinate corresponding to the at least one point comprise:
instructions for creating a matrix equation corresponding to each point based on the absolute position coordinate of each point, the relative position coordinate of each point, and the transformation matrix;
instructions for composing the matrix equation corresponding to each point into overdetermined equations; and
instructions for solving the overdetermined equations to obtain the matrix parameters of the transformation matrix.

17. The robot of claim 16, wherein the instructions for solving the overdetermined equations to obtain the matrix parameters of the transformation matrix comprise:
instructions for decoupling the overdetermined equations; and
instructions for solving the decoupled overdetermined equations based on a least squares method to obtain the matrix parameters of the transformation matrix.

18. The robot of claim 16, wherein the transformation matrix is for transforming the absolute coordinate system to the relative coordinate system, and the equation of the transformation matrix is:

$$\begin{bmatrix} x_{map}^i & y_{map}^i & 1 & 0 \\ y_{map}^i & -x_{map}^i & 0 & 1 \end{bmatrix} \begin{bmatrix} \cos(\theta) \\ \sin(\theta) \\ m \\ n \end{bmatrix} = \begin{bmatrix} x_{odom}^i \\ y_{odom}^i \end{bmatrix}$$

where, $(x_{map}^i, y_{map}^i)$ is the absolute position coordinate of the i-th point; $(x_{odom}^i, y_{odom}^i)$ is the relative position coordinate of the i-th point; and θ, m, and n are the matrix parameters.

19. The robot of claim 15, wherein the absolute positioning method comprises positioning the robot through distances between the robot and a plurality of base stations.

20. The robot of claim 15, wherein the robot further comprises an odometer, and the relative positioning method comprises positioning the robot through the odometer, wherein the relative coordinate system comprises an odometer coordinate system of the odometer.

* * * * *